US008123887B2

(12) United States Patent  
Green (10) Patent No.: US 8,123,887 B2  
(45) Date of Patent: Feb. 28, 2012

(54) CONTINUOUSLY FORMED FIBER REINFORCED COMPOSITE STRENGTH MEMBER

(76) Inventor: David E. Green, Aurora, OH (US)

( * ) Notice: Subject to any disclaimer, the term of this patent is extended or adjusted under 35 U.S.C. 154(b) by 354 days.

(21) Appl. No.: 12/462,811

(22) Filed: Aug. 10, 2009

(65) Prior Publication Data

US 2010/0032081 A1 Feb. 11, 2010

Related U.S. Application Data

(60) Provisional application No. 61/188,325, filed on Aug. 11, 2008, provisional application No. 61/188,290, filed on Aug. 8, 2008, provisional application No. 61/188,473, filed on Aug. 11, 2008.

(51) Int. Cl.  
*B29C 70/52* (2006.01)

(52) U.S. Cl. .................. 156/166; 156/181; 156/209

(58) Field of Classification Search .............. 156/166, 156/180, 181, 209, 219, 220  
See application file for complete search history.

(56) References Cited

U.S. PATENT DOCUMENTS

| | | | |
|---|---|---|---|
| 244,872 A | 7/1881 | Fischer | |
| 2,419,328 A | 4/1947 | Watson et al. | |
| 2,684,318 A | 7/1954 | Meek | |
| 3,895,896 A | 7/1975 | White et al. | |
| 4,695,509 A | 9/1987 | Cordova et al. | |
| 4,861,621 A | 8/1989 | Kanzaki | |
| 5,264,060 A * | 11/1993 | Lambing et al. | 156/180 |
| 5,286,320 A | 2/1994 | McGrath et al. | |
| 5,362,545 A | 11/1994 | Tingley | |
| 5,374,385 A | 12/1994 | Binse et al. | |
| 5,424,388 A | 6/1995 | Chen et al. | |
| 5,456,781 A | 10/1995 | Tingley | |
| 5,556,496 A | 9/1996 | Sumerak | |
| 5,632,837 A * | 5/1997 | Carmien | 156/172 |
| 5,700,417 A | 12/1997 | Fernyhough et al. | |
| 5,741,384 A | 4/1998 | Pfeiffer et al. | |
| 5,783,013 A | 7/1998 | Beckman et al. | |
| 5,928,735 A | 7/1999 | Padmanabhan et al. | |
| 6,037,049 A | 3/2000 | Tingley | |
| 6,105,321 A | 8/2000 | KarisAllen | |

(Continued)

OTHER PUBLICATIONS

"ICC ES Legacy Report;" ICC Evaluation Service, Inc.; www.icc-es.org (2002).  
"Acceptance Criteria for Fiber-Reinforced-Polymer Glued-Laminated Timber Using Mechanics-Based Models;" *ICC Evaluation Service, Inc.*; (2005).  
"Current State of Reinforced Wood Technology: New Products, Codes and Specifications;" 3rd International Conference on Advanced Engineered Wood Composites; (2005).

(Continued)

*Primary Examiner* — Michael Tolin  
(74) *Attorney, Agent, or Firm* — D. Peter Hochberg; Sean F. Mellino; Daniel J. Smola (57) ABSTRACT

A continuous method for making a thermoset resin matrix, which is reinforced with predominantly continuous fibers, and the product made from that method. The product can be produced at a thickness below about 0.060", or even below a thickness of about 0.035", and incorporated as a material to combine with or attach to other products for providing an increased strength to those other products, such as wood support beams (gluelam), wood laminates, truck floors and trusses. The product can also be used to strengthen composite thermoplastic lumber, other thermoplastic extrusions and moldings, and aluminum extruded products, as well as for being added to pultruded or molded thermoset plastic products to allow for specific areas of increased strength while maintaining a low reinforcement level in other areas and for providing a resin rich surface.

32 Claims, 6 Drawing Sheets

U.S. PATENT DOCUMENTS

| | | |
|---|---|---|
| 6,179,942 B1 | 1/2001 | Padmanabhan |
| 6,749,921 B1 | 6/2004 | Edwards et al. |
| 6,787,626 B2 | 9/2004 | Dewanjee |
| 6,893,524 B2 | 5/2005 | Green |
| 7,419,724 B2 | 9/2008 | Chen et al. |
| 2007/0113958 A1 | 5/2007 | Brown et al. |
| 2007/0113983 A1 | 5/2007 | Brown et al. |
| 2007/0116941 A1 | 5/2007 | Brown et al. |
| 2007/0117921 A1 | 5/2007 | Brown et al. |

OTHER PUBLICATIONS

Tingley, Daniel A.; Predicting Strength Criteria for Kevlar and Fiberglass Reinforced Plastic (KRP & FRP) Glued Laminated Beams; Proceedings of the Second Pacific Engineering Conference 1989; vol. 2 (1993).

* cited by examiner

CONTINUOUSLY FORMED FIBER REINFORCED COMPOSITE STRENGTH MEMBER

CROSS-REFERENCE TO RELATED APPLICATION

This application claims priority of U.S. Provisional Application No. 61/188,325, filed Aug. 11, 2008, under Title 35, United States Code, Section 119(e), U.S. Provisional Application No. 61/188,290, filed Aug. 8, 2008, under Title 35, United States Code, Section 119(e) and U.S. Provisional Application No. 61/188,473, filed Aug. 11, 2008, under Title 35, United States Code, Section 119(e).

BACKGROUND OF THE INVENTION

1. Field of the Invention

The present invention relates to methods of manufacturing composite fiber and resin reinforcements for strength members. More particularly, the present invention relates to a process for manufacturing a fiber-reinforced composite material comprising a plurality of fibers impregnated with a polymer matrix, the composite reinforcements being relatively thin while having improved strength.

2. Description of the Prior Art

The concept of reinforcing products with fibers to strengthen the products in order to become structural members is known in the art. The advantage of doing so, the method for attachment, and conventional methods for making the structural members are also established in the art. For example, U.S. Pat. No. 5,928,735 (Padmanabhan, et al.), U.S. Pat. No. 6,179,942 (Padmanabhan, et al.), U.S. Pat. No. 5,456,781 (Tingley) and U.S. Pat. No. 6,105,321 (Karis-Allen) may be considered relevant in the art. It is known that the use of composites formed by the pultrusion process is a convenient way to attain the use of fibers for reinforcing products. This is further disclosed in U.S. Pat. No. 6,037,049 (Tingley) and U.S. Pat. No. 5,362,545 (Tingley).

Pultrusion is generally defined as a continuous process of manufacturing of composite materials with constant cross-section whereby reinforced fibers are pulled through a resin, possibly followed by a separate pre-forming system, and into a heated die, where the resin undergoes polymerization and where the reinforced plastic is shaped and the resin is cured. Pultrusion is known for the ability to fabricate a continuous length of reinforced plastic and to accommodate desired placement and orientation of fibers, which allows for the mechanical properties of the pultruded part to be designed for a specific purpose or application. Pultruded parts comprise longitudinally aligned fibers for axial strength and/or obliquely aligned fibers for transverse strength. Many resin types may be used in pultrusion, including polyester, polyurethane, vinylester and epoxy.

Reinforcements for structural members have been manufactured using pultrusion processes. This process generally involves wetting fibers with resin and pulling the wet fibers through a mold where the resin is cured by heating the resin, as noted above. Exemplary pultrusion processes are disclosed, for example, in U.S. Pat. No. 2,419,328 (Watson, et al.), U.S. Pat. No. 2,684,318 (Meek), U.S. Pat. No. 3,895,896 (White, et al.), U.S. Pat. No. 5,286,320 (McGrath, et al.), U.S. Pat. No. 5,374,385 (Binse, et al.), U.S. Pat. No. 5,424,388 (Chen, et al.), U.S. Pat. No. 5,556,496 (Sumerak), U.S. Pat. No. 5,741,384 (Pfeiffer, et al.) and U.S. Pat. No. 5,783,013 (Beckman, et al.). Current known methods in the art typically do not prepare structural members having thicknesses under 0.060", and in particular under 0.040". In addition, the glass content of a known pultrusion process can be at about 65% by volume. Currently the fiber volume of a pultruded product based on conventional methods known in the art could range from about 10% to about 70%, depending on the particular fibers, resin, and processing technique employed.

During processing, before the resin is cured to a solid, fibers have a tendency to fracture when an uneven distribution of fibers build up in a particular area of the die. This excessive build-up of fibers results in a higher percent by volume and can result in fracture of the fiber value exceeds 70% by volume.

Another type of pultrusion process, often referred to as continuous lamination, involves spreading resin on a film, such as MYLAR®, adding fiber materials to the spread resin and then adding a top cover film to form an envelope that essentially becomes a flexible mold. This "sandwich" configuration is shaped by tension and mechanical forces, and is then pulled through an oven to cure the "sandwich" configuration into a desirable form.

A third variation of pultrusion provides placing the fibers under tension, saturating the fibers with photo-initiated resin, pulling the fibers through a series of sized dies or nip rolls to form the fibers into a bundle or web, and then exposing the fibers to high intensity ultraviolet light to initiate curing. A surface coating is often then applied and cured to provide a desired resin rich surface. This process has been used in forming artificial leather and strengthening members of fiber optic cables. Exemplary variations of this process are disclosed in U.S. Pat. No. 244,872 (Fischer), U.S. Pat. No. 4,861,621 (Kanzaki), U.S. Pat. No. 5,700,417 (Fernyhough) and U.S. Pat. No. 6,893,524 (Green).

A fourth variation of pultrusion provides placing the fibers under tension, saturating the fibers with thermo-reactive resin, and pulling the fibers through a series of sized dies to form the fibers into a round bundle while they are exposed to elevated temperatures, such as those found in an oven. This process has been used for making fishing rods, and has also been adapted for manufacturing fiberoptic cable strength members.

Thermoset polyurethane resin has shown the ability to be formulated to adjust the flexibility, elasticity and tensile properties. This elasticity has provided a more secure bonding to man-made fibers, such as aramid and nylon, as shown in U.S. Pat. No. 4,695,509 (Cordova, et al.). The adjustable formulations are highlighted in several patents that show the capabilities for making a very tough product as shown in U.S. Pat. No. 6,787,626 (Dewanjee). However, some prior art has specifically advised against using polyurethane in connection with continuously formed fiber reinforced composite strength members and the process for the manufacture thereof Some difficulties with the current art have been identified. For example, the pultrusion process as discussed above is limited. The closed die method becomes less efficient when the thickness of the fibers is at 0.030" and less because of the lack of space for foreign objects, crossed fibers, fiber knots and splices. This is complicated with the use of rigid resins like polyester, vinyl ester, epoxy, acrylic and others as the interlaminate shear is reduced and the product can split longitudinally (i.e., parallel to the fibers) quite easily while in process, as well as during post processing. In this instance, the processing speed will also be kept to less than 10 ft. per minute.

A method for providing a greater interlaminate shear (to reduce the splitting) in thicknesses below 0.030" comprises adding a web of materials to the structure. The web of materials has fibers in directions other than parallel to the longitudinal fibers. In doing this, an amount of the longitudinal fibers must be replaced in a normally disproportional amount, thus reducing the product strength and requiring a thicker laminate to enable the same reinforcing function.

Many of the open (i.e., without a die or cover envelope) continuous processes have been substantially limited to the making of round products, and more specifically to the making of products having a thickness greater than 0.035" and when substantially all of the fibers are longitudinal fibers. In addition, the more commonly used resins of polyester and vinyl ester release harmful emissions that increase when cured in an open process and are required by state and federal laws to be limited.

SUMMARY OF THE PRESENT INVENTION

The present invention involves an improved pultrusion method for manufacturing composite fiber and resin reinforcements for strength members and which are thin compared to strength members known in the art while maintaining strength ratios (the ratio being the strength as it to relates to the thickness). The method of the present invention relates to an improved method for manufacturing such composite reinforcements having a thickness of 0.060" and under, and in particular a thickness of 0.040" and under, and more in particular a thickness of 0.030" and under. The method of the present invention also relates to a process for manufacturing a fiber-reinforced composite material comprising a plurality of fibers impregnated with a polymeric matrix having a glass content of about 60% volume, or less. The plurality of fibers are unidirectional reinforcing fibers, and the plurality of fibers that are impregnated with a polymeric matrix are aligned along the longitudinal dimension of the strength member. Alternatively, at least some of the plurality of fibers may be obliquely aligned fibers for improving transverse strength.

The continuous method for manufacturing composite fiber and resin reinforcements for strength members comprises a thermoset resin matrix and is reinforced with predominantly continuous fibers. The product can be incorporated as a component material to combine with or attach to other products for providing an increased strength to those other products, such as wood support beams (gluelam), wood laminates, truck floors and trusses. The product can also be used to strengthen composite thermoplastic lumber, other thermoplastic extrusions and moldings, and aluminum extruded products. The product can also be added to pultruded or molded thermoset plastic products to allow for specific areas of increased strength while maintaining a low reinforcement level in other areas and for providing a resin rich surface.

The method includes the pre-tensioning of the fiber and resin reinforcements, guiding the fibers through a pre-treating station, saturating the fibers with resin in an impregnator, initiating cure at a curing station, applying any surfacing embossing and receiving any surface coating, guiding the composite through a post-cure station and proceeding through a pulling mechanism for accumulation and storage for future use in desirable lengths.

Another embodiment of the method for manufacturing a continuous fiber reinforced thermoset plastic material comprises the steps of tensioning the fibers, guiding the fibers through a pre-treating station, saturating the fibers with resin in an impregnator, positioning the impregnated fibers onto a receiving member and initiating cure at a curing station, applying any surfacing embossing and receiving any surface coating, adding a second receiving member onto the composite, applying pressure to form a sandwich configuration, guiding the sandwich configuration through a post-cure station and proceeding through a pulling mechanism for accumulation and storage for future use in desirable lengths. In this alternative embodiment, the strength member is fabricated of fiber-reinforced composite material comprising a plurality of fibers impregnated with a polymeric matrix. The plurality of fibers is substantially unidirectional reinforcing fibers, and the plurality of fibers that are impregnated with a polymeric matrix are substantially aligned along the longitudinal dimension of the strength member.

It is an object of the present invention to provide a method for manufacturing a composite strength member wherein the sides comprise layers of bonded fibers, the fibers are oriented with respect to the longitudinal axis of the strength member, the layers comprise at least one layer of 0-degree fiber and the plurality of fibers are unidirectional reinforcing fibers.

It is another object of the present invention to provide a method for manufacturing a composite structural member wherein a ratio of the plurality of fibers to the resin matrix is from about 40% to about 50% by volume.

It is yet another object of the present invention provide a method for manufacturing a composite structural member wherein the thickness is under 0.060", in particular under 0.040" and more in particular under 0.030".

It is yet another object of the present invention to provide a method for providing an improved composite fiber and resin reinforcements for strength members.

It is also an object of the present invention to provide a method which is more time- and cost-efficient than known methods.

There is thus a need for providing an improved method for manufacturing composite structural member having a thickness under 0.060" while maintaining the strength ratios of thicker products.

Other objects of the present invention will become apparent from the description to follow and from the appended claims.

DETAILED DESCRIPTION OF THE PRESENT INVENTION

The present invention is now described with reference to the drawings, wherein like reference numerals are used to refer to like elements throughout. In the following description, for purposes of explanation, numerous specific details are set forth in order to provide a thorough understanding of the present invention. It will be evident, however, to one skilled in the art that the present invention may be practiced without these specific details. The following description of the preferred embodiment(s) is merely exemplary in nature and is in no way intended to limit the invention, its application or uses.

Figures 1, 2, 3, 4, 5:
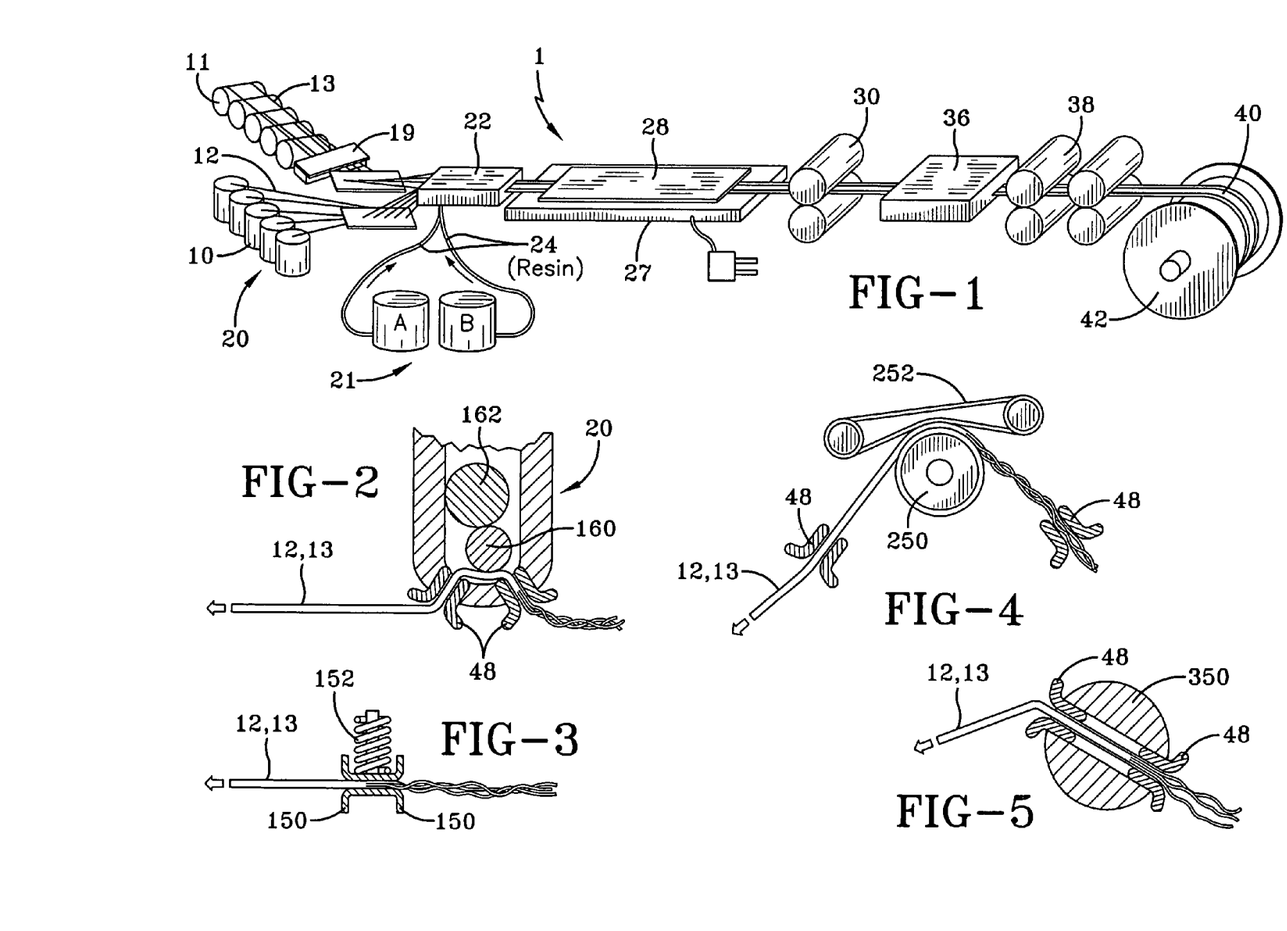
FIG. 1 is a schematic illustration of an apparatus for the method according to the present invention for manufacturing a composite strength member.
FIG. 2 is a schematic illustration of an alternative tensioning mechanism for use with the method according to the present invention.
FIG. 3 is a schematic illustration of another alternative tensioning mechanism for use with the method according to the present invention.
FIG. 4 is another schematic illustration of an alternative tensioning mechanism for use with the method according to the present invention.
FIG. 5 is yet another schematic illustration of an alternative tensioning mechanism for use with the method according to the present invention.

Referring to FIG. 1, a schematic representation of an apparatus for one embodiment for the method in accordance with the present invention is shown and referred to generally at numeral 1. Creels 10, 11 are provided from which various desirable fibers 12, 13 are supplied to apparatus 1. A broad range of fiber materials may be used in accordance with the present invention. For example, fibers 12, 13 may be rovings, tows, yarns, other fiber bundles or even individual filaments. In particular, fibers 12, 13 may comprise materials selected from fiberglass, basalt, aramid, carbon, nylon, polyester, polyethylene, ceramic, boron, steel, metal alloys, and other natural and man-made fibers as known in the art and are unidirectional reinforcing fibers (i.e., having a 0-degree orientation) wherein part or all of the reinforcing fibers comprise the man-made or natural fibers. Alternatively, at least some of the plurality of fibers may be obliquely aligned fibers (i.e., having other than a 0-degree orientation) for further improving the transverse strength. In particular, the reinforcing fibers are comprised entirely or at least partially of carbon fibers, aramid, fiberglass, and basalt. In accordance with the present invention, the plurality of fibers may be random, woven, sewn or swirled reinforcing fibers. Still further, the plurality of fibers is held in tension by the resin matrix. In the embodiment shown in FIG. 1, fibers 11 comprise aramid and fibers 12 comprise fiberglass.

A tensioning device (not shown in FIG. 1) is provided for tensioning each of fibers 12, 13 that are supplied to the process. The tensioning device may be provided on creels 10, 11 at the point of exit of fibers 12, 13 from creels 10, 11. However, it should be appreciated that the tensioning device may be provided at any advantageous point between the exit point of fibers 12, 13 to the entrance of the impregnator (discussed below). For example, the specific positioning of the tensioning device may depend on the specific fibers employed and which are exiting creels 10, 11. In this embodiment, the tensioning device 20 is associated with creels 10, 11. In other words, the tensioning device is attached to creels 10, 11 which contain fibers 12, 13 so that fibers 12, 13 are under tension when entering an impregnator or an impregnation chamber 22 (discussed further below). The tensioning devices may be commercial units, which are conventional in the art or even custom made units and may be inline, i.e., integral to the process in accordance with the present invention. However, it should be appreciated that the employment of the tensioning device is not required as normal travel of fibers 12, 13 through the process of the present invention will provide sufficient tension onto fibers 12, 13 to facilitate completion of the end product. Nevertheless, the use of the tensioning device may be advantageous to pre-stress the fibers for producing a stronger end product.

The tensioning device comprises brake wheels (not shown) for providing the tension. The brake wheels resist the unwinding of the various fibers 12, 13 from creels 10, 11. In other words, the brake wheels prevent the fibers from unraveling and may also be a variation of a tensioning device. In accordance with the present invention, the tensioning device creates a substantially equal amount of tension in each of the longitudinal fibers 12, 13 of the finished reinforcement.

Referring now to FIGS. 2-5, various alternative embodiments of a tensioning device are shown and described in schematic form for use with the method of the present invention, and referred to generally at numeral 20. The alternative tensioning devices 20 enable the tensioning of the fibers 12, 13 to be manually and/or electronically controlled for adjusting the specific tension on fibers 12, 13. With reference to FIG. 2, fibers 12, 13 pass through a pair of non-aligned ceramic eyelets 48. A bearing roller 160 and weight ball 162 provide tension onto fibers 12, 13 as fibers 12, 13 are pulled through eyelets 48. Bearing roller 160 may comprise ultra high molecular weight polyethylene (UHMWPE), ceramic or any other comparable wear-resistant and non-abrasive material known in the art. Weight ball 162 should be of a size and weight so as not to provide excessive tension onto fibers 12, 13. In particular, the tension placed on the fiber that is produced by the weight ball assembly may be in the range between 0.2-10 lbs, and more particularly in the range between 1.5-3 lbs (i.e., pound-force).

Referring to FIG. 3, a biasing spring 152 is employed for pushing against pressure disks 150 to provide a compressive force on fibers 12, 13 as fibers 12, 13 pass between pressure disks 150. It should be appreciated that pressure disks 150 are conventional in the art and may be commercial units comprising conventional steel disks.

Referring to FIG. 4, a rubber belt 252 and a brake controlled sheave 250 compresses the fibers 12, 13 to create tension in the fibers 12, 13 as fibers 12, 13 pass through pair of eyelets 48.

Referring to FIG. 5, a pair of ceramic eyelets 48 is provided on a movable member 350 which may be advantageously rotatable or pivotable. In this embodiment, pair of ceramic eyelets 48 are moveable/pivotable/rotatable to various angles to adjust the amount of tension in the fibers 12, 13 as fibers 12, 13 pass through pair of eyelets 48. For example, ceramic eyelets 48 are pivotable not more than 135° and in particular are pivotable not more than 90° relative to the x-axis.

Referring back to FIG. 1, fibers 12, 13 which are under tension are passed through an optional fiber pre-treating or pre-heating station 19. Pre-treating or pre-heating station 19 is advantageous for heating fibers 12, 13 prior to entry into an impregnator 22. Fiber pre-treating, such as by pre-treating in a fiber pre-treating chamber or fiber pre-heating station 19 may be an oven, a heater or a comparable higher temperature chamber to warm the surface of fibers 12, 13 in order to remove material from the surface of fibers 12, 13 and to drive off moisture in fibers 12, 13 or from the surface of fibers 12, 13. For example, fiber pre-treating/pre-heating station 19 may bring the surface temperature of fibers 12, 13 to be up to about 120° F. for fibers other than aramid. In the instance where pre-heating of aramid is required, the surface temperature of the aramid fibers 12, 13 may be up to about 350° F. Fiber pre-treating/pre-heating station 19 may be an electrostatic or plasma chamber when a plasma or corona treatment is required for modifying the surface of fibers 12, 13. Plasma or corona treatment is an electric discharge field through which the fibers travel and which modifies the surface of the fibers. Plasma or corona treatment is advantageous for facilitating the bonding of the resin matrix to the fibers for increasing the particular desired properties of the finished product.

The treated fibers 12, 13 subsequently pass into an impregnator 22 and are saturated with resin 24. The resin 24 for saturating fibers 12, 13 may be curable by conventional cure treatments. Cure treatments which may be employed in the present invention, include thermal contact, thermal radiation, photo-radiation, electron beam radiation, and radio frequency (e.g., microwave) radiation. In one embodiment, the resin 24 is a thermosetting resin that is capable of being cured by thermal contact and/or thermo-radiation. In particular, the resin may be any resin that can be converted from a liquid stage by molecular cross-linking initiated by heat or other energy, (e.g., a thermoset resin). Examples of such resin 24 include polyesters, vinyl esters, epoxy, phenolic and mixtures of polyesters, vinyl esters, epoxy, phenolic or polyurethane. In particular, the resins in accordance with the present invention may include entirely or at least in part thermoset polyurethane resin, thermoset phenolic resin, thermoset polyester resin, thermoset epoxy resin, thermoset melamine resin, and thermoset acrylic resin, or combinations thereof. The ratio of the plurality of fibers to the resin matrix in accordance with the present invention is about from 20% to about 60% by volume, more particularly about from 30% to about 50% by volume, and even more particularly about from 40% to about 50% % by volume.

As shown in FIG. 1, a supply system or pump 21 supplies resin 24 to impregnator 22. A supply system may be a meter system, a mixing system or a catalyzation system. System or pump 21 is an apparatus that is typically commercially available and known in the art for delivering a specified ratio of components to facilitate the ultimate complete cure for the resin 24. The components are then passed through a commercially available static mixer (not shown) and fed into the impregnator 22 as a homogenous mixture. The static mixer may be any conventional static mixer known in the art and is positioned at the end of the tubing of the pump system where the components come together in the impregnator 22. The pump system 21 allows for custom blending and catalyzation to provide for faster reacting resin 24 with less concern for reduced pot life because the quantity that is catalyzed is comparably small.

The wet or saturated fibers 12, 13 are then subjected to forming within the impregnator 22. Forming fibers 12, 13 within the impregnator 22 facilitates appropriately locating the various fibers 12, 13 relative to each other. In this embodiment, a package of longitudinally aligned and tensioned fibers 12, 13 are created. Fibers 12, 13 are located adjacent each other with liquid resin 24 generally filling the space between the fibers 12, 13 when they exit the impregnator 22.

Figure 6:
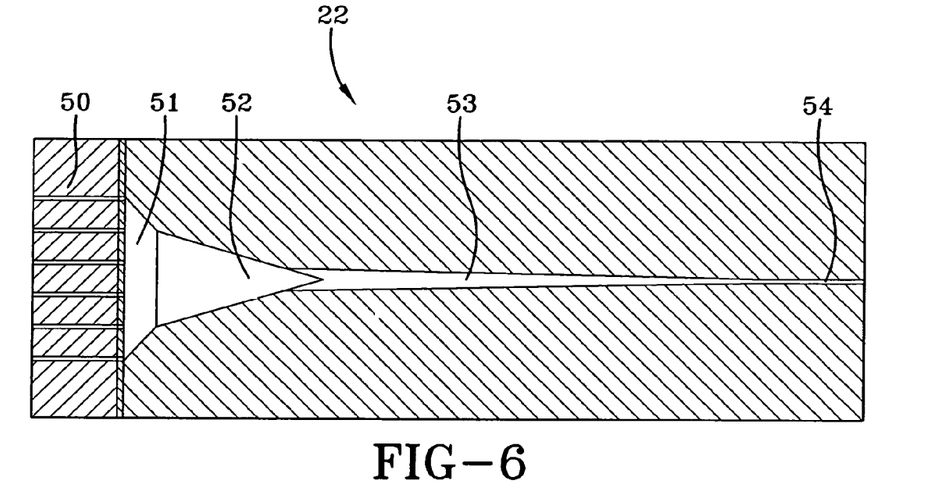
FIG. 6 is a schematic illustration of the internal chambers of the impregnator for use with the method according to the present invention.

Referring to FIG. 6, impregnator 22 will be discussed in greater detail. Impregnator 22 comprises five chambers to fully wet and saturate and position the fibers 12, 13 relative to each other and with the resin 24. Impregnator 22 comprises an entrance plate 50, which comprises a plate having through-holes 50a through which fibers 12, 13 pass for entry into a flooding chamber 51. Through-holes or bushings 50a are of a sufficient diameter and length to prevent leakage of resin 24 passing therethrough or to prevent resin 24 from flowing back out of the impregnator 22, e.g., a diameter of at least ⅛ inch and a length in the range of 1 inch-3 inches and more particularly in the range of 1.25"-1.5". The length and diameter of the holes or bushings 50a may also depend on the particular pressure and the viscosity of the resin 24, as well as the speed of the fibers 12, 13 passing therethrough. Determination of optimum speed would be determined by one skilled in the art. For example, through-holes or bushings 50a having a diameter of ⅛ inch and a length of 1 inch may be compatible with through speeds of at least two feet/minute. The entrance plate 50 or the bushings 50a comprise a wear resistant material, such as hardened steel, stainless steel or ceramic.

Flooding chamber 51 is a space provided adjacent to entrance plate 50 for allowing the resin to free flow around the entering fibers 12, 13. Flooding chamber 51 may be an area of under one inch in length immediately following the entrance plate 50 with only slight cross-section area reduction over that length. An increase in this length will not hinder the present invention, except that a greater amount of resin will remain in process that would be subject to premature curing in the impregnator 22. The actual decrease in cross-section of flooding chamber 51 determines the transition between flooding chamber 51 and compaction chamber 52 (discussed below). For example, reduction in the area of the flooding chamber 51 of more than 10% reduction determines the transition between flooding chamber 51 and compaction chamber 52.

As indicated above, a compaction chamber 52 is the chamber immediately following flooding chamber 51. Compaction chamber 52 is a progressively narrowing chamber for allowing fibers 12, 13 to be brought closer together for initiating some contact between fibers 12, 13, for generating the initial removal of voids from between fibers 12, 13 and for filling those voids with resin 24. The cross-sectional area of compaction chamber 52 is reduced to about 10% to 30% over its length, and more particularly to about 15% to 25%. The length of compaction chamber 52 may be about 1.5 times the height measured at the transition of the flooding chamber 51 and the compaction chamber 52. An increase in this length will not hinder the present invention, except that a greater amount of resin will remain in process that would be subject to premature curing in the impregnator 22.

A substantially wedge-shaped pressure chamber 53 immediately follows compaction chamber 52. Saturation of fibers 12, 13 is completed at pressure chamber 53 and fibers 12, 13 are subjected to their maximum pressures (e.g., 50 psi) and moved into the desired shape. The shallow and progressive incline of the wedge shape of pressure chamber 53 provides for the pressure increase. As the fibers 12, 13 are pulled through pressure chamber 53, fibers 12, 13 pull resin 24 that is in contact with or in proximity to fibers 12, 13. As pressure chamber 53 gets smaller or narrower, less resin 24 will fit so excess resin 24 is pushed back towards the entrance of pressure chamber 53. The resistance to flow of resin 24 and the attachment and attraction of resin 24 to fibers 12, 13 cause an increasing pressure along the length of pressure chamber 53. This pressure forces resin 24 into any remaining voids in fibers 12, 13. The amount of taper over the length of pressure chamber 53 is somewhat dependant on the particular materials chosen and the throughput speed involved, but generally a decrease in cross-sectional area may be 5% to 15%, or advantageously 8% to 10%, of the original cross-sectional area as measured at the transition between compaction chamber 52 and pressure chamber 53 to accomplish sufficient saturation and shaping of fibers 12, 13.

Still referring to FIG. 6, an exit mouth 54 is provided as the final area of impregnator 22. As the law of fluid dynamics indicates, the pressure loss occurs over a length of a tube and if the length is too short the fluid will simply increase in speed to allow more volume to pass. Exit mouth 54 incorporates this law of fluid dynamics to provide enough length to contain the resin pressure in the pressure chamber 53 and to limit the amount of excess resin 24 that overflows fibers 12, 13. Exit mouth 54 is an opening with substantially parallel sides from which fibers 12, 13 and resin 24 exit impregnator 22, and the fibers have a relatively narrow cross-sectional diameter. The length of exit mouth 54 may be between 0.5" and 4", and more particularly may be between 1" and 2". The running speed of the impregnation chamber of impregnator 22 may be about 2 inches/minute to about 10 feet/minute. The cross-sectional diameter of exit mouth 54 may be about the same as pressure chamber 53 at the transition between pressure chamber 53 and exit mouth 54.

Returning to FIG. 1, after passing through impregnator 22, fibers 12, 13 may have various tendencies to cause fibers 12, 13 to spring away from each other. This phenomenon is caused by the individual strand spring-like rigidity of fibers 12, 13, the liquid viscosity of the resin being too low to hold the fibers 12, 13 in place and the ratio of fibers 12, 13 to resin 24 being relatively high. In accordance with the present invention, the ratio of fibers 12, 13 to resin 24 is about from 10% to about 70% by volume, with results in the range of about 20% to about 60% by volume, with better results in the range of about from 30% to about 50% by volume, and with the best results in the range of about from 40% to about 50%. In order to avoid the surface from becoming too irregular from the aforementioned tendency and to maintain a compact and resin rich surface, the saturated fibers 12, 13 and resin 24 are passed between a heated die bottom 27 and an upper support pressure pad 28 for effecting the initial cure and for at least partially curing and partially solidifying the resin 24.

Upper support pressure pad (or top pressure pad) may be, in accordance with the present invention, a flexible top die 28. Flexible top die 28 advantageously accommodates any sections or portions of high thickness of saturated fibers 12, 13 passing between heated die bottom 27 and top die 28 and facilitates the passing therebetween without disrupting the process. Flexible top die 28 may advantageously comprise a material which is flexible enough to accommodate a spot thickness change of 50% of the reinforcement thickness. The flexibility of the top die 28 should come from a thin, hard substance as wear from the contact with the moving reinforcement is present and release from the forming surface is necessary. The flexible top surface may advantageously comprise a flexible silicone rubber belt that runs with the reinforcement and release (i.e., peel free) because of its elasticity. A flexible steel belt could also be employed. Still further, for example, a steel shim stock may be employed as the material for flexible top die 28. The thickness range of flexible top die 28 may advantageously be about from 0.010" to 0.030' and should comprise enough strength and wear resistance to be compatible in accordance with the present invention. Flexible top die 28 may further optionally include a backup of springs, air pillow or bladder (discussed further in relation to FIG. 11 below) to hold top die 28 in order to maintain an average thickness requirement. Alternatively, a hot oil bladder may be employed for both effectively heating the top die 28 and also for providing the required flexibility and pressure onto saturated fibers 12, 13 passing therebetween. The bladder could even further be a stainless braid and silicone (or other high temperature synthetic rubber) hydraulic and oil heater hose, or even comprise sections of such hose running across the travel direction of the fibers. In the case where a flexible steel belt is employed as top die 28, an additional external mold release may be applied to the surface of the belt when it is not in contact with the curing reinforcement.

The combination of heated die bottom 27 and upper support pad 28 comprise an initial curing station. It should be appreciated by one skilled in the art that the resin should not stick to the die (i.e., heated die bottom 27 and upper support pad 28) during the present process. A mold release agent may be employed for providing a lubricating barrier between the resin and the surrounding die. For example, a zinc sterate lubricant may be used as a mold release to penetrate between the resin and the die surface. It should be appreciated that zinc sterate is attracted to the steel die surface and sits there, so when the resin cures, the resin does not cure or get stuck into the pores of the steel because the zinc sterate creates a barrier between the steel die and the resin. The zinc sterate also serves as a lubricant between the fibers and the filler particles so that the resin mix obtains for reducing any potential processing problems arise. Any alternative lubricant which is conventional in the art could of course also be employed.

Figure 7:
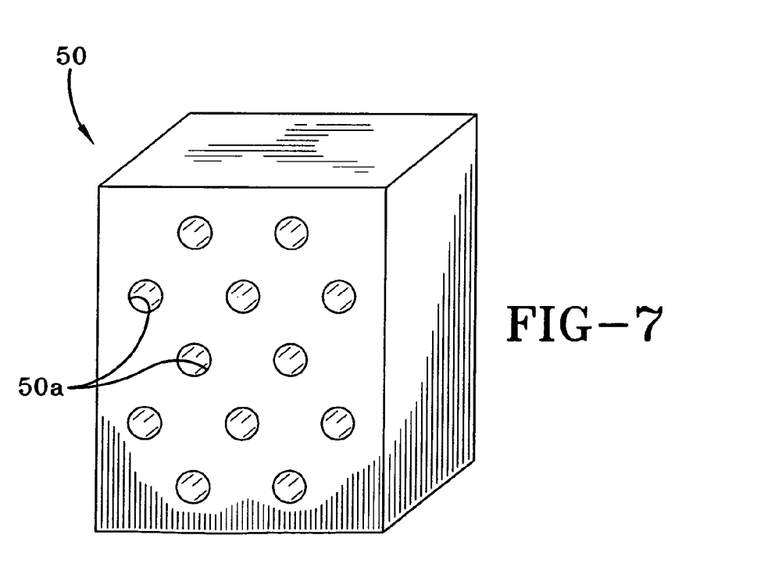
FIG. 7 is a schematic illustration of a hole size and hole placement in the impregnator entrance plate for use with the method according to the present invention.

Referring to FIG. 7, a schematic depiction of entrance plate 50 is shown having a plurality of holes 50*a*. Entrance plate 50 forms a typical hole placement and diameter for up to three fiberglass rovings of a 900 yield or 3 aramid fibers of a 3200 denier placed in each hole. Any number of holes 50*a* may be employed as desired or necessary.

Figure 8:
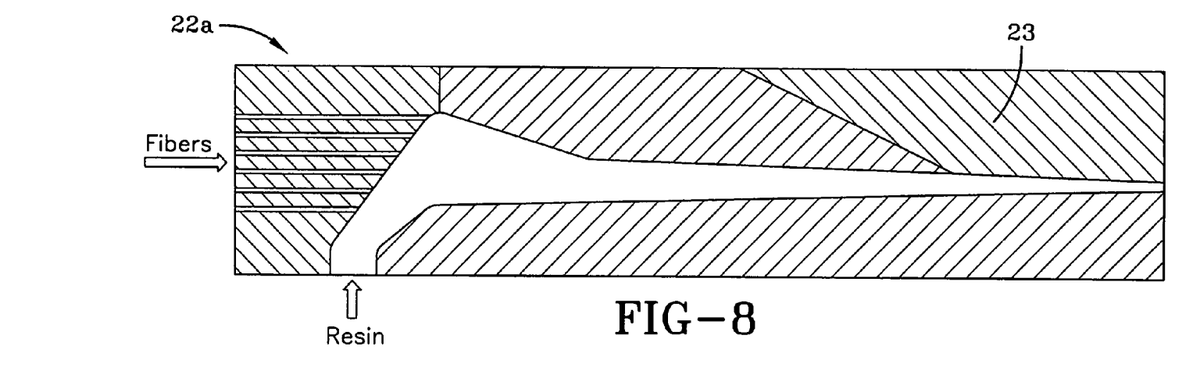
FIG. 8 is a conceptual schematic illustration of an alternative impregnator showing the internal profile to reduce areas of non-flowing resin for use with the method according to the present invention.

Referring now to FIG. 8, a schematic depiction of the internal profile of an alternative impregnator is shown at numeral 22*a*. Alternative impregnator 22*a* comprises a configuration to limit dead spaces where resin 24 can remain stagnate and cure prematurely. The configuration of impregnator 22*a* facilitates the flow of resin 24 and the paths of fibers 12, 13 in order to continually displace old resin 24 with fresh resin 24. A purge section 23 is also provided in the alternative impregnator 22*a*. Purge section 23 may be adjusted or raised to open the exit area of the impregnator for removal of obstructions or for any other relevant reasons. Purge section 23 provides for a moveable or removable section to be incorporated into impregnator 22*a* to allow for partial disassembly to purge a process problem, such as broken or bunched-up fibers, without having to undesirably disassemble the entire impregnator 22*a*.

Figure 9:
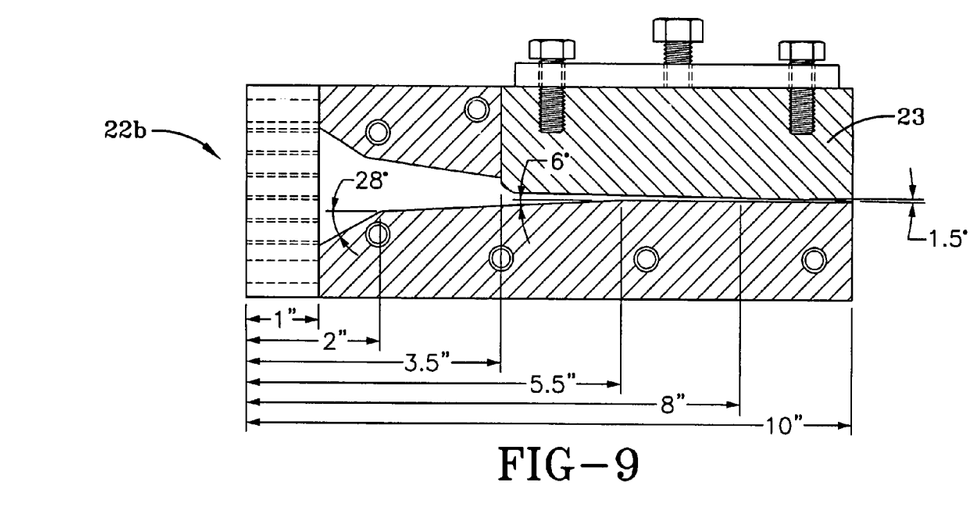
FIG. 9 is a conceptual schematic illustration of an alternative impregnator showing the internal profile for slow processing for use with the method according to the present invention.

Referring now to FIG. 9, another alternative embodiment of impregnator 22 is shown and referenced to at numeral 22*b*. Impregnator 22*b* in this embodiment may be employed for use with long pot life resin. In this embodiment, impregnator 22*b* demonstrates modified internal profiles and purge section 23 dimensions that can be used with slower throughput speeds of under 15 feet/minute, or even under 10 feet/minute.

Figure 10:
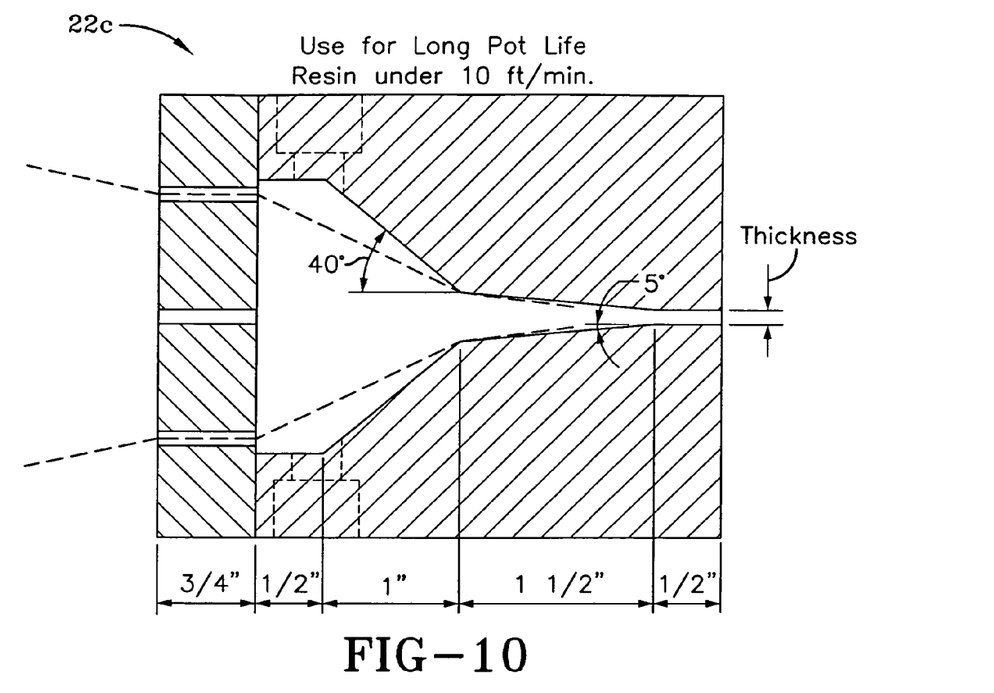
FIG. 10 is a conceptual schematic illustration of an alternative impregnator showing the internal profile for slow processing where resin pot life is not a factor for use with the method according to the present invention.

Referring now to FIG. 10, yet another alternative embodiment of impregnator 22 is shown and referred to at numeral 22*c*. In this embodiment, impregnator 22*c* demonstrates modified internal profiles concepts and dimensions that can be used with slower throughput speeds of under 15 feet/minute where the pot life of the resin is of longer time.

Figure 11:
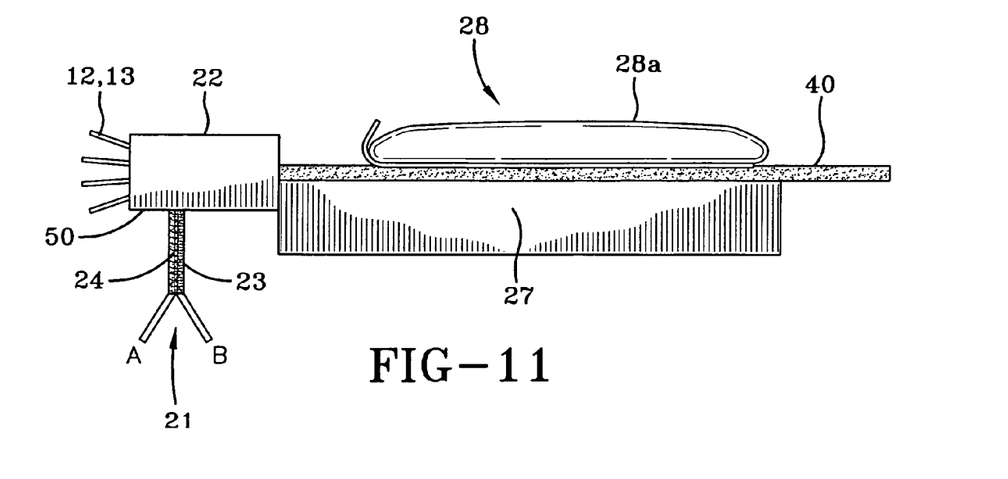
FIG. 11 is a conceptual schematic illustration of the forming and initial curing area for use with the method according to the present invention.

Referring now to FIG. 11, the primary forming and curing area in accordance with the present invention is shown. Fibers 12, 13 are shown entering impregnator 22 through the entrance plate 50 and the resin 24 is shown entering the impregnator 22 through static mixer 23. The saturated fibers 12, 13 are then shown continuing on between die bottom 27 and top pressure pad 28 and subsequently exiting as a composite product 40. A pressure bladder 28a may also be provided on top of top pressure pad 28 to equalize the pressure in the system.

Referring again to FIG. 1, after passing through the initial curing station 27 and top pressure pad 28, the composite product 40 may pass between a pair of optional embossing rolls or rollers 30 to transfer surface irregularity or texture to the surface of the composite product 40. Rollers 30 may comprise any material conventional in the art.

The process of the present invention can further include the application of a veil (not shown) around the cured composite 40 for stabilizing the cured composite 40 and for improving cross-wide strength. It should be appreciated that application of the veil would be understood to one skilled in the art. Veil may be applied after the exit from impregnator 22 and prior to post-curing. It should also be known to one skilled in the art that veil may comprise nylon, but may also comprise any material conventional in the art which is thin, strong and has a high heat tolerance, such as fiberglass, aramid, carbon, sand, and the like. Materials such as carbon-based materials and metals may be employed for providing improved conductivity.

The heat generated by the initial curing station 27 and top pressure pad 28 may be sufficient in this embodiment of the present invention to provide the necessary amount of heat required to complete curing. It should be appreciated by one skilled in the art that the particular amount of heat generated by the initial curing station is directly dependent on the particular speed and the particular length of the die which are employed. However, in instances where reduced cure is desired for embossing the surface or if higher line speed is desired, more forced curing may be desired. Alternatively, a post cure chamber 36 may be employed to provide additional heat sources. Exemplary heat sources may be, but are not limited to, infrared heaters, radio frequency (e.g., microwave) heaters, or other conventional devices to provide thermal radiation, convection or high intensity light for photo-initiation.

Figure 12:
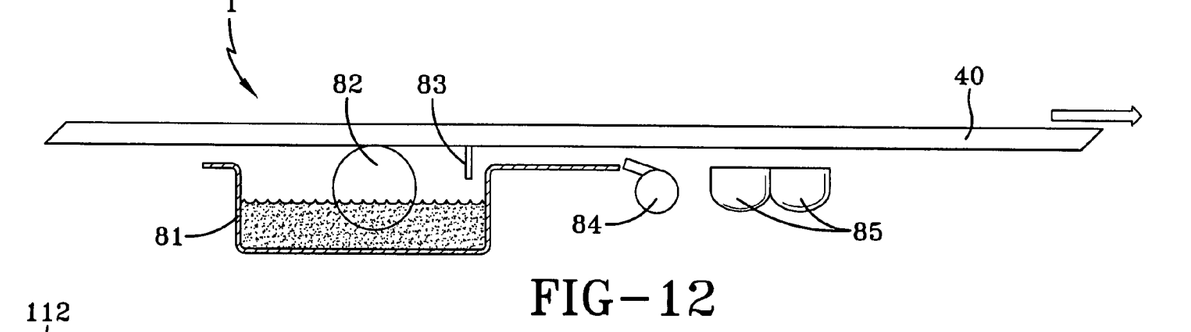
FIG. 12 is a conceptual schematic illustration of an optional liquid coating and curing station for use with the method according to the present invention.

Referring to FIG. 12, an optional coating station is shown and referred to at numeral 32. Optional coating station 32 can be included in the process of the present invention after composite product 40 passes through post curing chamber 36 to provide an additional coating to the composite products on the surface of the strength member. The additional coating may be applied and cured by any known method which is conventional in the industry. Optional coating station 32 comprises a coating reservoir 81 that will wet the surface of a coating wheel 82, which in turn transfers the coating to be applied to the composite strength member 40 as it passes across coating wheel 82. A scraper, such as a doctor blade 83, removes any excess coating and reduces dripping. An air knife 84 (or any comparable device known in the art) completes the even spreading of the coating onto composite strength member 40. For example, a photo-initiated coating may be employed, whereby ultra violet lamps 85 are in turn employed to activate the coating in order to complete the curing of the coating.

Returning to FIG. 1, pairs of wheels 38 are provided to operate as puller clamps to pull the cured composite 40 out of post cure chamber 36, if post cure chamber 36 is employed. In this embodiment as shown in FIG. 1, two pairs of wheels (i.e., four total wheels) are provided. However, additional or fewer pairs of wheels may be provided as necessary. Alternative puller clamps may include caterpillar treads or another clamp and pull source as known in the art. In this embodiment, a drive mechanism (not shown) drives pairs of wheels 38. Pairs of wheels 38 provide the force which works in combination with the tensioning device 20 to cause tension on fibers 12, 13 throughout the curing process. Thus, fibers 12, 13 in accordance with the present invention are under a constant longitudinal tension while resin 24 is cured. Puller clamps 38 feed the cured composite 40 to a roll-up station 40 for storing and subsequent processing. Alternatively, the cured strength member may be delivered to a cutting station (not shown), whereby the reinforcements are cut into desired sizes and shapes.

Figure 13:
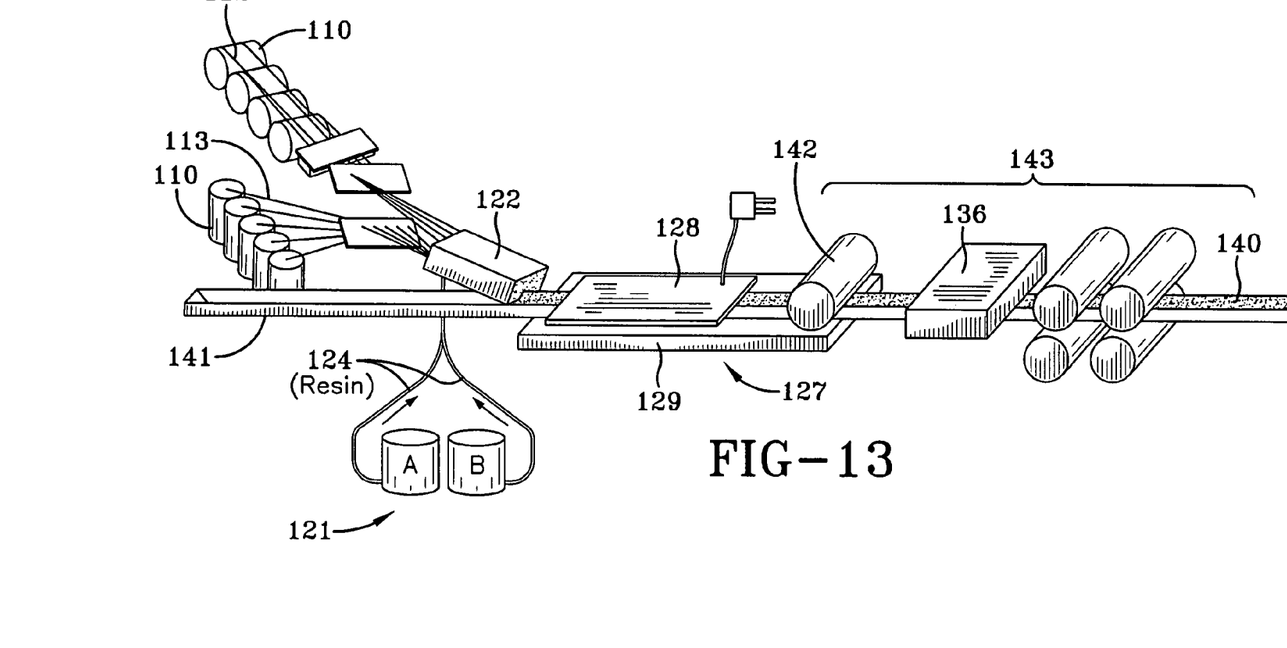
FIG. 13 is an alternative schematic illustration of an apparatus for manufacturing a composite strength member while attaching to a receiving member for use with the method according to the present invention.

Referring now to FIG. 13, an alternative embodiment of the process of the present invention is shown and described. The method as shown in FIG. 13 is an alternative mode of incorporating the method for making the strength member into an attachment to a first receiving member 141. One section of the initial curing station is replaced with a prepared receiving member 141 that will travel with the process. Heated die bottom 27 (in FIG. 1) is replaced with a bottom support pad or rollers 129 and the top pressure pad 128 is heated. The fibers 112, 113 and resin 124 exit the impregnator/impregnation chamber 122 and are laid onto a first receiving member 141 where the heated top pressure pad 128 will affect the adhering to and curing to of the composite 140 to the receiving member 141. From the exit of the initial curing station, the process will continue as shown and described in FIG. 1, with the optional step of adding a second receiving member 143 for making a "sandwich" configuration of the strength member. In this embodiment, first receiving member 141 and second receiving member 143 may be of the same material or may be different.

The alternative embodiment of the process for manufacturing a continuous fiber reinforced thermoset plastic material comprises the steps of tensioning the fibers, guiding the fibers through a pre-treating station, saturating the fibers with resin in an impregnator, positioning the impregnated fibers onto first receiving member 141 and initiating cure at a curing station, applying an optional surfacing embossing and receiving any surface coating, adding second receiving 143 member onto the composite, applying pressure to form a sandwich configuration, guiding the sandwich configuration through a post-cure station and directing the sandwich configuration through a pulling mechanism for accumulation and storage for future use in lengths as desired. The process for manufacturing a continuously formed fiber reinforced composite strength member in proximity to receiving members, wherein the strength member is fabricated of fiber-reinforced composite material comprising a plurality of fibers impregnated with a polymeric matrix, results in a composite wherein the plurality of fibers are substantially unidirectional reinforcing fibers, and the plurality of fibers that are impregnated with a polymeric matrix are substantially aligned along the longitudinal dimension of the strength member.

As shown in FIG. 13, a tensioning device (not shown) is optionally provided for placing fibers 112, 113 in tension. Fibers 112, 113 pass through an optional pre-treating station 119. Pre-treating station 119 is selected from the group consisting an oven, infrared heater, or an electrostatic plasma device. Fibers 112, 113 are then saturated in an impregnator 112 having the same configuration as that described in FIGS. 1 and 6, namely, comprising an entrance plate with holes for the fibers to pass through of sufficient length and cross-sectional area to limit the resin leaking from inside the impregnator and to position the fibers for effective coating and desired final alignment inside the impregnator, a flooding chamber to allow the resin that is fed into the impregnator to flow around and come into contact with the fibers, a compaction chamber to move the fibers closer together and to initiate the resin wet-out of the fibers having an exit cross-sectional area that is reduced to about 15% to 25% of its entrance cross sectional area and a length that is about 1.5 times the entrance height, a pressure chamber to complete the resin saturation and fiber alignment having an exit cross-sectional area that is reduced to about 8% to 10% of its entrance cross-sectional area and a length that is about 30 times the entrance height, and an exit mouth to maintain the fiber placement and to reduce the amount of excess resin which exits the impregnator having sides that are substantially parallel and a length of about 1" to 2".

Receiving members 141, 143 are selected from the group consisting of aluminum, steel, metal alloys, thermoplastic, thermoset plastic, wood and wood products, and combinations of man made and/or natural materials, and receiving member 141, 143 may be the same as each other or may be different. As shown in FIG. 13, plurality of fibers 112, 113 are impregnated with a polymeric matrix inside impregnator 122 and are placed onto first receiving member 141 and are directed into an initial curing station 127. Initial curing station 127 comprises curing selected from the group consisting of thermal contact, thermal convection, infrared, ultraviolet, electron beam and radio frequency, and the polymeric matrix is at least partially cured. The partially cured composite strength member is then directed into an optional embossing roll 142 for implanting a surface texture onto the exposed sides of the composite 140. The partially cured composite strength member is then directed onto an optional coating station (not shown in FIG. 13) for placing a coating onto the exposed side of the composite. The coating may be at least partially cured and may be selected from the group consisting of adhesives, paints, primers, surface treatment, activation chemicals, bonding agents, and other protecting or preparing materials. Second receiving member 143 joins composite strength member 140 and first receiving member 141, and is positioned to form a sandwich configuration with the strength member being in the center position with receiving members 141, 143 on either side. Opposing pressure is applied on the receiving members 141, 143 so that the strength member is compressed between the receiving members 141, 143.

Composite strength member 140 is then directed into a post cure chamber 136. Post cure chamber comprises at least one method of curing initiation selected from the group consisting of thermal contact, thermal convection, infrared, ultraviolet, electron beam, and radio frequency, wherein the polymeric matrix is at least partially cured to the degree that final cure either has occurred or may occur at a future state of use.

Figure 14:
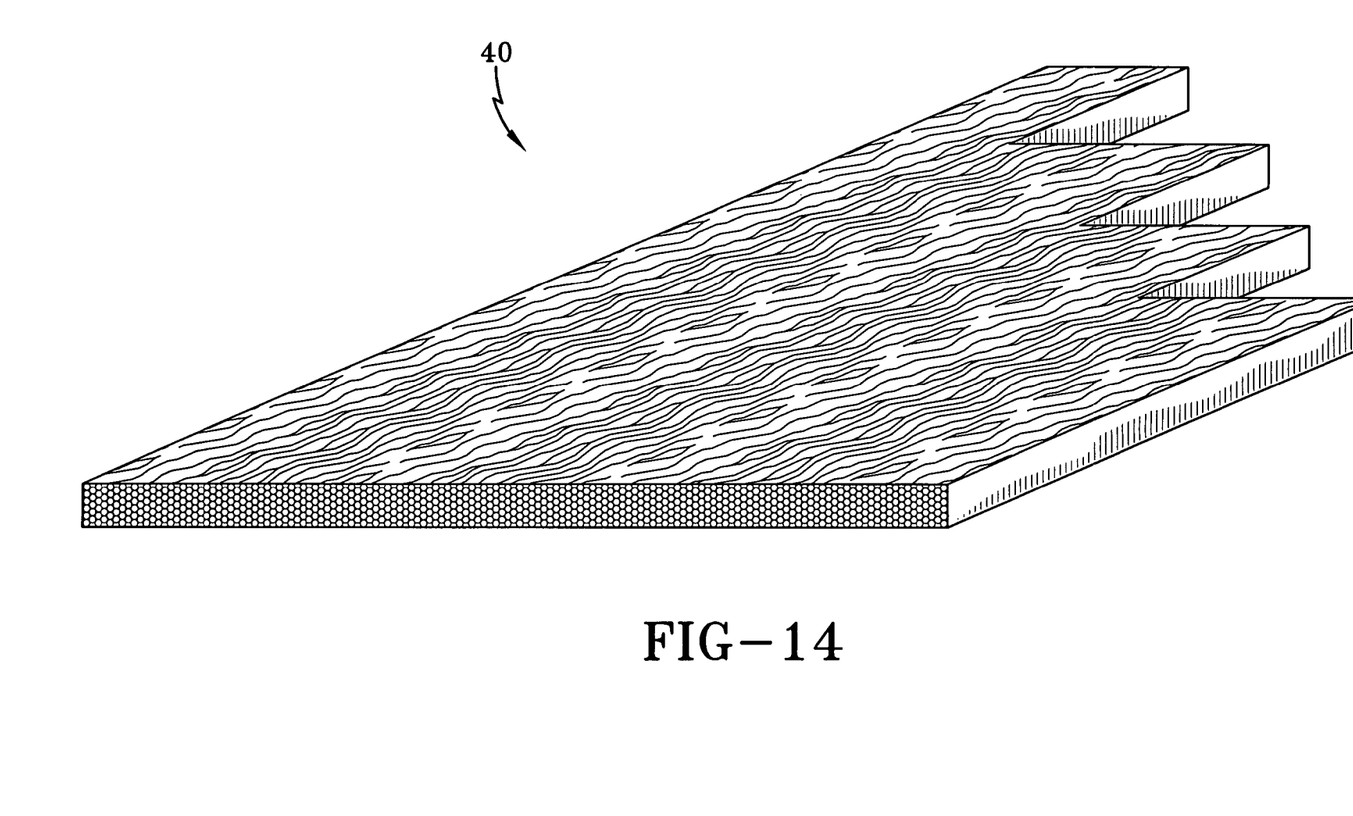
FIG. 14 is cross-sectional perspective view of a composite strength member resulting from the method according to the present invention.

Referring to FIG. 14, a cross-sectional and perspective view of the strength member 140 as produced in accordance with the present invention is shown and described.

The product of the method of the invention involves the use of a matrix containing thermoset polyurethane resin in a composite FRP combined with the use of EPI adhesive to provide a successful process for bonding the composite FRP to wood or wood-based products to the degree that the bond will meet the ICC AC280, ASTM D-2559 and ANSI A191.1 requirements. The term "wood-based product" can include any type composite which contains wood particles. For example, a wood-based product can include but is not limited to "plastic lumber" (also known as composite lumber) which comprises wood particles in the form of saw dust bonded together with a thermoplastic material.

Emulsion Polymer Isocyanate (EPI) adhesives are two-component adhesives based on reaction of a mixture of water based emulsions of carboxylated styrene-butadiene copolymer latex (SBR), ethylene vinyl acetate copolymer (EVA) and polyvinyl acetate (PVAc) type with an isocyanate hardener (crosslinker) forming water-resistant bonds. EPI adhesives can be formulated in many ways to give the optimal performance with respect to water resistance, curing speed, type of substrate, strength and viscosity in each bonding operation.

The inventor has found the use of an EPI adhesive to be very effective because it bonds to both the wood and the FRP composite. It will pass the ICC requirement for moisture and the rest of the ICC requirements. Because wood or wood-based products are receptive to moisture and EPI is based on the reaction of a mixture of water based emulsions, the EPI penetrates and is drawn into the irregularities and pores of the wood. As the EPI cures, a strong mechanical bond is created between the EPI and the wood or wood-based product. Once cured, the EPI adhesive is impervious to moisture.

With regard to the FRP, the EPI will bond to the FRP by flowing into any pores and irregularities. However, as previously mentioned, the FRP usually has a smooth surface free from pores and irregularities. Therefore, a strong mechanical bond is not formed. However, a molecular bond linking the polyurethane resin of the FRP to the isocyanate of the EPI is created. Since this chemical bond is at the molecular level, this chemical bond is much stronger than the mechanical bond between the wood and EPI.

Test results of FRP of present invention with EPI have greatly surpassed the AC280 requirements. The AC280 required shear strength for an adhesive bonded between an FRP and Douglas Fir wood is 1100 psi. Test results of the present invention using Douglas Fir wood have shown the shear strength to be as high as 2200 psi. This is twice as high as the AC280 requirement. These results are unexpected based on what is known in the art with respect to the thermoset polyurethane resin and the EPI adhesive.

As previously mentioned, the prior art did not teach or suggest using a thermoset polyurethane resin for the resin matrix of a fiber reinforced composite because it was thought to be too flexible, too hard to use as a matrix in the reinforcement, and to display poor bonding to adhesives.

The emulsion-polymer-isocyanate (EPI) adhesive is known in the art and can be purchased from adhesive manufacturers such as Ashland Chemical Company of Covington, Ky.

The following describes how the FRP is bonded to the wood using the EPI adhesive. The EPI adhesive is mixed according to the manufacturer's directions and applied between the wood and the FRP composite, clamped under pressure as would be done normally in a glulam beam and held until the curing process of the EPI adhesive takes place. No surface preparation of the FRP composite is necessary to ensure proper bonding of the adhesive because a thermoset polyurethane resin matrix is being utilized as the matrix of the FRP.

Although no surface preparation of the FRP composite is necessary as previously stated, a number of known methods may be employed to further promote the bonding and to clean the surfaces of the FRP composite and wood. Normally, wood will have the surface either planed or sanded to provide an open and clean surface in any bonding application to prevent dirt and sap buildup on the wood. A cleaning or washing station can be used to clean dirt or oil from the wood or FRP composite that may result from processing of the wood and the FRP composite. Alcohol wipes may be used to clean the FRP composite. Another type of surface treatment is known as plasma treating (corona treating) which is an electrostatic treatment that cleans the FRP composite surface and wood surface and changes molecular structure to promote chemical bonding as discussed below. A cleaning station or plasma treater may be installed at various areas of the assembly line when the wood is joined to the FRP composite.

The combination of a FRP comprising a thermoset polyurethane matrix and an EPI adhesive produces unexpected results in relation to the wood composite industry. As shown above, the shear strength of the present invention far exceeds the AC280 requirement. As previously mentioned, it was believed that the use of a fiber-reinforced thermoset composite as a wood composite was too brittle for shaping or hammering nails into. Furthermore, the EPI adhesive was also disregarded as being an effective adhesive as compared to other known adhesives for use in the wood composite industry. Therefore, the prior art actually taught away from the present invention. Thus, the present invention is novel and non-obvious in view of the prior art.

The FRP comprising a thermoset polyurethane matrix will now be described, including methods for making the FRP.

According to an exemplary embodiment, a method and apparatus are provided for producing a composite fiber and resin reinforcement for strength members to use in preparing reinforced wood and wood-based products. The composite fiber and resin reinforcement are provided in the form of a thermoset polyurethane matrix for use in the production of truck flooring, reinforced wood beams and the like.

The improved resin system is intended to provide the composite components with relatively high bending and compressive strength such that the components may be produced without the need to provide fiber reinforcement in the transverse direction (i.e., the direction transverse to the longitudinal or "pulling" direction). Such components may advantageously be produced at a lower weight, material cost, and capital cost as compared to the production of conventional composite components using traditional resin systems. In contrast to conventional pultrusion processes that utilize transverse fibers (e.g., webs or mats of fibers incorporated in the component), the production speed of the composite components according to the exemplary embodiments described herein are not slowed by the addition of the transverse fibers, thereby requiring fewer machines to supply the desired quantity in a given time frame.

Fibers may be rovings, tows, strands, yarns, other fiber bundles or even individual filaments. The terms "rovings", "tows" and "strands" are nomenclature that are used in the fiber industry. Fiberglass fibers are referred to as roving while carbon fibers are known as tows. Aramid fibers may be referred to as rovings, tows and strands. Strands can also refer to the filaments that make up the roving or tows. A broad range of fiber materials may be used with the thermoset polyurethane resin matrix. For example, fibers may be made of materials selected from fiberglass, basalt, aramid, carbon, nylon, polyester, polyethylene, ceramic, boron, steel, metal alloys, and other natural and man-made fibers. Specifically, it has been found that basalt, fiberglass and aramid fibers are preferred due to sufficient strength and relatively low cost. Carbon fibers are preferable if very high tensile strength is necessary and if electrical conductivity is allowable. Aramid fibers resist any potential creep in the fiberglass fibers. Fiberglass and basalt are the lowest cost fibers. Basalt fibers can replace fiberglass fibers. Basalt is stronger than some fiberglass but is also higher in price. Basalt is more chemical resistant than fiberglass and would not degrade as quickly if exposed to water and other environmental contaminants. Both fiberglass and basalt are also the heaviest fibers. Therefore, if reduced weight becomes more important than cost, fiberglass and basalt may be replaced by carbon fibers or aramid.

The thermoset polyurethane resin precursor system includes an isocyanate, a polyol or polyol blend, and a system of lubricants and other additives that are typically referred to as a "mold release." The isocyanate is also referred to as MDI (methylene diphenyl diisocyanate). Mold release is a commercial internal release agent which allows the resin to release from the die as it cures to a solid form. Three manufactures of mold release include Axel, Tecklub and Stevens. The resin system may also optionally include one or more polymeric additives that may be used to modify the surface of the resulting component, to modify the physical properties of the component, to provide improved processing, or to provide other benefits. Additionally, the resin system may include one or more fillers which may act passively to reduce the cost of the overall resin system (e.g., by taking the place of more costly constituents) or may actively function to provide improved physical properties or improved processing.

Pigments may be optionally added to the resin system to create a desired color for the composite. The pigments can be commercially purchased from a company such as Plasticolors, Inc. of Ashtabula, Ohio. Wetting agents may be used to increase the effective wetting of the resin to the fillers and the fibers as detailed below. Wetting agents are available from sources such as BYK-Chemie GmbH of Germany. Zinc sterate lubricant may be optionally used as a mold release to penetrate between the resin and the die surface, but also serves as a lubricant between the fibers and the filler particles to make the resin mix act like it is "slippery" so that less processing problems arise. During a normal pultrusion process, there is a possibility that the resin may stick to the die during curing, and a mold release serves the function to prevent this. The zinc sterate is attracted to the steel die surface and remains there, creating a barrier between the resin and the die. Therefore, when resin cures, the resin is not cured into the pores of the steel. When the resin acts "slippery," the fibers slide or "flow" to areas of less pressure to provide a more even fiber content rather than piling up in one area. If fibers are all bunched in one area, they may require more force to move through the die, and this force could cause fiber failure. Peroxide catalysts are available from a catalyst supplier and may be used to initiate the single part thermoset polyurethane resin by causing cross linking between the resin molecules and styrene or other monomer molecules in the resin. The commercial resin suppliers such as Plexinate Ltd. Of New Zealand and Reichhold Inc. of North Carolina, recommend a peroxide to initiate their one part resin systems.

The amount of fibers in the thermoset polyurethane resin matrix depends on the desired thickness of the reinforcement. For example, a reinforcement for a truck floor is typically 0.028-0.032 inches thick, and should contain between 50%-70% fiber by volume. A more preferable range is 60%-65% fiber by volume.

A thermoset polyurethane resin matrix has an elongation similar to that of the reinforcing fibers so the load on the entire reinforcement is evenly distributed. The elongation of basalt is 3.15%. The elongation of fiberglass is 3.5% and the elongation of aramid is 2.9%. The thermoset polyurethane resin elongation can be adjustable with the common industry standard additives, fillers and resin specifics since these additives do not elongate with the resin. Therefore, more additives and less resin equates to less elongation. Some of these additives, fillers and resin specifics include mineral fillers such as calcium carbonate, clay, glass, and others are rigid chunks, spheres, or flakes that reduce the effective elongation of the completed and cured resin mixture, because these additives replace the resin and do not themselves elongate as stated above. The available polyols as well as the available commercially prepared resins will have different elongations depending on their individual proprietary formulas. For example, some companies like Plexinate offer a proprietary flexiblizer to increase the elongation of their one-part polyurethane. The industry also offers a thermoplastic polyvinyl acetate (PVA) that may be added to non-polyurethane resin mixes such as vinyl ester and polyester to provide some increase in elongation. A thermoset polyurethane resin matrix elongation value in excess of the fiber elongation value is needed to prevent fracture of the resin. Having a higher fiber elongation value than the resin matrix elongation value causes weakness in the reinforcing material because the fibers are not supported by the resin matrix after the resin matrix is destroyed from being elongated past its limits.

In its final form, the reinforcing material comprises a first pair of generally opposed sides parallel to each other and a second pair of generally opposed sides parallel to each other, where the two sets of sides enclose an internal section comprising the thermoset polyurethane resin matrix and the reinforcing fibers. The first set of sides has a width greater than the width of the second set of sides, i.e. the shape of a rectangle. The shape of the reinforcing material usually matches the shape of the wood or wood-based product. However, other shapes, both regular and irregular could be utilized. The thickness of the reinforcing material is usually less than 0.060 inches. Preferably, the reinforcing material is less than 0.035 inches which creates an elongated flat-like structure or sheet-like structure. This elongated flat-like structure may be in the form of a web, a plate or a plank. It is also possible that the reinforcing material could have other profile characteristics such as ribs or other irregularities.

The thermoset polyurethane resin system has a toughness that will allow for impacts, abrasion, and flexing that would damage other systems. The toughness and the elongational properties of the thermoset polyurethane resin matrix reduce the tendency for cross-fiber splitting (i.e. splitting between the fibers) and after-assembly damage potential. Cross-fiber splitting occurs when a fracture develops between the fibers which may result during handling of a reinforcement and in the procedure to attach a reinforcement to the wood or wood-based products when a force is applied at other than parallel to the fibers. It should be noted that after the reinforcement is attached to the wood or wood-based product, forces other than parallel to the fibers would not result in cross-fiber splitting because the reinforcement is "sandwiched" between the wood and such forces could not gain access to the reinforcement between the wood. For example, the reinforcement may be attached to a 2×4 piece of wood, with the reinforcement lying flat on top of the 2×4 and bonded to the 2×4 by an adhesive. A second 2×4 may then be placed on top of the reinforcement and may also be attached via an adhesive. The only exposed part of the reinforcing material would be the thickness of the material, which is usually under 0.060 inches. Therefore, the reinforcing material is "sandwiched" in between the two pieces of wood. After-assembly damage may occur when fasteners such as nails or other items are forced through a reinforcement when attached to the wood or wood-based product and further separate the fibers. After-assembly damage may also include underlying wood damage resulting from the wood receiving an impact that causes a crack or splintering of the wood or from rotted wood. However, the elongation properties of the resin matrix of the present invention significantly reduce any cross-fiber splitting and after-assembly damage that could occur. The resin matrix allows the reinforcement to be ductile rather than brittle. Therefore, any mishandling of the reinforcement would not result in a fracture that would lead to cross-fiber splitting. Regarding after assembly damage, if a nail is forced through the reinforcement, the resin matrix will elongate or stretch rather than fracture under the impact. Therefore, the fibers will remain intact with the resin matrix and will not split or be separated. In addition, the bonding of the resin to the fibers reduces the tendency of internal cracks that are more common in other resin systems which can propagate and lead to cross-fiber splitting.

The thermoset polyurethane resin mix can be prepared using commercially available polyurethane 2-part resin systems. Some suppliers of the polyurethane 2-part resin systems include Bayer MaterialScience LLC of Pittsburgh, Pa., Huntsman Advanced Materials of France, BSAF—The Chemical Company of Germany and Resin Systems Inc. (RSI) of Canada. Additional fillers and colors may be added to the polyol side as desired. Commercially available polyurethane 1-part resin systems can also be used to create the thermoset polyurethane resin mix. Suppliers of 1-part resin systems include Plexinate, Reichhold and Ashland. The 1-part resin systems may be supplemented with additional ingredients as normal in the industry for polyester resin systems. In the alternative to a commercially available polyurethane resin, polyols and isocyanate in the chemical or commodity markets may be separately purchased and then combined to form the thermoset polyurethane resin.

Optionally, a nylon veil may be added to the FRP composite for increasing cross-wide strength during manual handling of the FRP composite and to further reduce any potential for cross-fiber splitting. The nylon veil is added to keep the FRP composite flat so good surface contact is achieved with the wood or wood-based product. The nylon veil may be placed on one or both sides of the FRP composite. The nylon veil may be 0.010 inches thick. It has been found that a suitable nylon veil is produced by Cerex Advanced Fabrics, Inc. under the trademark Cerex®.

Strength testing has shown that a standard beam width beam may be reduced in width when the reinforcement of the present invention is used. For example, it has been found that a typical 5⅛ inch wood member can be reduced in size to a 3⅛ inch wooden member when the reinforcement of the present invention. This is a substantial amount of reduction wood that leads to lower costs and materials.

The following specific examples may be used to construct various truck floor reinforcements to be used with wood. The 3.5 inch wide material reinforcement was arbitrarily chosen based on customer specifications. Other beam widths may also used depending on customer specification.

EXAMPLE 1

According to an exemplary embodiment, a 3.5 inch wide truck floor reinforcement was prepared using 34 tows of 3420 aramid, 96 strands of fiberglass roving 900 yield, 12 strands of fiberglass roving 250 yield, a 3.6 inch wide and 0.010 inch thick nylon veil (Cerex®), and a 2-part polyurethane resin with 15% filler. The numeral "3420" when describing the aramid fibers is the nomenclature used by Teijin Aramid (a manufacturer of aramid fibers) and refers to the unit of measure (decitex) of the fiber which is a determination of weight per length. "Tex" is a unit of measure for the linear mass density of fibers and is defined as the mass in grams per 1000 meters. The decitex, abbreviated "dtex", is the mass in grams per 10,000 meters. The fiberglass roving 900 yield is a nomenclature used in the U.S. to determine the weight per length. A 900 yield means that the size is sufficient to provide 900 yards in a pound. Cerex® is the brand name, as noted above, of the nylon veil material that is made from continuous nylon strands heat bonded together to form a fine mesh.

EXAMPLE 2

According to another exemplary embodiment, a 12.43 inch wide truck floor reinforcement was prepared using 110 tows of 3420 aramid, 506 strands of fiberglass roving 900 yield, and a 1-part polyurethane resin.

EXAMPLE 3

According to yet another exemplary embodiment, a 12.43 inch wide truck floor reinforcement was prepared using 20 tows of 3420 aramid, 605 strands of fiberglass roving 900 yield, a 12.5 inch wide 0.010 inch Cerex®, and a 1-part polyurethane resin.

EXAMPLE 4

According to still another exemplary embodiment, a 12.43 inch wide truck floor reinforcement was prepared using 630 strands of basalt roving 900 yield, 12.5 inch wide 0.010 inch Cerex®, and a 1-part or 2-part polyurethane resin.

The following specific examples may be used to construct various reinforcing materials to strengthen wood or wood-based beams.

EXAMPLE 5

According to an exemplary embodiment, a 3.5 inch wide beam reinforcement was prepared using 40 tows of 3420 aramid, 98 strands of fiberglass roving 900 yield, 20 strands of fiberglass roving 250 yield, and a 1-part or 2-part polyurethane resin with 18% filler.

EXAMPLE 6

According to another exemplary embodiment, a 3.5 inch wide beam reinforcement was prepared using 40 tows of 3420 aramid, 72 strands of fiberglass roving 900 yield, 20 strands of fiberglass roving 250 yield, and a 1-part or 2-part polyurethane resin with 5-25% filler.

The following are some typical polyurethane resin mix formulations that were used or can be used in the above examples:

| Materials | amount |
| --- | --- |
| Dow Polyol | 1000 |
| Mold release | 63 |
| Filler | 560 |
| Bayer Isocyanate (MDI) | 1600 |
| Pigment | 65 |
| RSI part A resin | 500 |
| RSI part B MDI | 500 |
| Bayer part A resin | 500 |
| Bayer part B MDI | 500 |
| Filler | 180 |
| Mold release | 25 |
| Pigment | 25 |
| Wetting agent | 1 |
| Reichhold Extreme resin | 1000 |
| Filler | 300 |
| Pigment | 33 |
| Mold release | 7 |

-continued

| Materials | amount |
| --- | --- |
| Zinc sterate lubricant | 15 |
| Byk w996 Wetting agent | 3 |
| Peroxide catalyst | 20 |
| Plexinate resin | 900 |
| Plexinate flexablizer | 100 |
| Filler | 300 |
| Pigment | 33 |
| Mold release | 7 |
| Zinc sterate lubricant | 15 |
| Byk w996 Wetting agent | 3 |
| Peroxide catalyst | 20 |

The reinforcing material of the present invention can be produced by known pultrusion methods as discussed in the Description of the Prior Art above. However, various processing problems arise when producing a reinforcing material less than 0.060 inches in thickness. Due to the minimal thickness of the reinforcing material, it is common for fibers to cross over or form knots in the matrix because the limited space in the resin matrix. As discussed above, cross over fibers can lead to excessive fiber percent by volume which can lead to fracture of the fibers. Therefore, the following method is preferable to produce a reinforcing material composite under 0.060 inches thick and more preferably about 0.030 inches thick.

The description of the invention is merely exemplary in nature, and thus, variations that do not depart from the gist of the invention are intended to be within the scope of the invention. Such inventions are not to be regarded as a departure from the spirit and scope of the invention. The present invention has been described with particular reference to the preferred embodiments thereof, but it should be understood that variations and modifications within the spirit and scope of the invention may occur to those skilled in the art to which the invention pertains.

I claim:

1. A process for manufacturing a continuous fiber reinforced composite strength member, said process comprising the steps of:
    placing the fibers in a tensioning device for tensioning the fibers;
    guiding the fibers into and through a pre-treating station;
    saturating the fibers with resin in an impregnator; and
    curing the fibers at a curing station, said curing station comprising a flexible first die and a rigid heated second die opposed and connected to said flexible first die, wherein the first and second dies are configured to contact the saturated fibers wherein the sides of said composite strength member comprise layers of bonded fibers, the fibers being oriented with respect to the longitudinal axis of said strength member, and wherein said layers of fibers are in a 0-degree orientation and wherein the strength member comprises a fiber-reinforced composite material comprising a plurality of fibers impregnated with a polymeric matrix, wherein the plurality of fibers are unidirectional reinforcing fibers, and wherein the plurality of fibers that are impregnated with a polymeric matrix are aligned along the longitudinal dimension of the strength member.

2. The process according to claim 1, wherein at least one layer of said layers of fibers has an orientation other than a 0-degree orientation.

3. The process according to claim 1, further comprising the steps of:
    applying a surface embossing to said cured fibers;

guiding said cured fibers through a post-cure station for receiving a post-cure surface coating; and pulling said cured fibers through a pulling mechanism and accumulating said cured fibers on a storage mechanism for storage.

4. The process according to claim 1, further comprising the step of, prior to said step of tensioning said fibers, passing said fibers through a pre-treating station selected from the group consisting of an oven, an infrared heater, and an electrostatic plasma device.

5. The process according to claim 1, wherein said step of saturating said fibers comprises saturating said fibers in said impregnator, wherein said impregnator comprises an entrance plate having a plurality of entry holes for facilitating the passing of the fibers into said impregnator and for positioning said fibers inside said impregnator for sufficient coating and alignment inside the impregnator, said entry holes having a length and cross-sectional area to limit the leakage of resin from inside the impregnator, and wherein said plurality of holes accommodate the fibers.

6. The process according to claim 1, wherein said impregnator comprises:
a flooding chamber for facilitating the flow of the resin that is fed into the impregnator around the fibers and to facilitate contact with the fibers;
a compaction chamber, having an entrance and an exit, for moving the fibers closer together and for initiating resin wet-out of the fibers, wherein said compaction chamber comprises an exit cross-sectional area that is reduced to about 15% to 25% of the entrance cross-sectional area and comprises a length that is about 1.5 times the entrance height;
a pressure chamber for completing the resin saturation and fiber alignment; and
an exit mouth for maintaining fiber placement and for reducing the amount of excess resin which exits the impregnator, wherein said exit mouth comprises sides that are substantially parallel and has a length of about 1" to 2".

7. The process according to claim 1, wherein said curing step comprises an initial curing step comprising directing said plurality of fibers which are impregnated with a polymeric matrix into an initial curing station, wherein said initial curing step comprises at least one curing method selected from the group consisting of thermal contact, thermal convention, infrared, ultraviolet, electron beam and radio frequency, and wherein the polymeric matrix is at least partially cured.

8. The process according to claim 1, wherein the fibers are partially cured at the curing station, and further comprising the step of directing the partially cured composite strength member into an embossing roll for implanting a surface texture onto at least one side of said composite.

9. The process according to claim 1, wherein said curing step further comprises directing said composite strength member into a post cure chamber for post-curing, wherein said post-curing step comprises at least one method selected from the group consisting of thermal contact curing, thermal convection curing, infrared curing, ultraviolet curing, electron beam curing and radio frequency curing, and wherein the polymeric matrix is at least partially cured to the degree that final cure either has occurred or may occur at a future stage of use.

10. The process according to claim 9, wherein said post-curing step further comprises the step of directing said at least partially cured composite strength member into a coating station for placing a coating onto at least one side of the composite, wherein the coating may be at least partially cured, and wherein the coating is selected from the group consisting of protection coating materials and preparing coating materials.

11. The process according to claim 10, wherein said coating material is selected from the group consisting of adhesives, paints, primers, surface treatment, activation chemicals and bonding agents.

12. The process according to claim 1, further comprising the step of pulling said strength member through the process with a puller and collecting said strength member in coils or lengths for future use, wherein the action of the fiber tensioning device work with the force of the puller to maintain the tension of the fibers as the matrix curing occurs, and wherein the action of the fiber tensioning device works with the force of the puller to maintain the tension on the strength member as cooling and setting of the matrix occurs.

13. The process according to claim 1, wherein said reinforcing fibers are random, woven, sewn or swirled reinforcing fibers and are selected from the group consisting of aramid fibers, polyethylene, nylon, polyester, ceramic, fiberglass, carbon and basalt.

14. The process according to claim 1, wherein the ratio of the plurality of fibers to the resin matrix is in the range of about 10% to about 70% by volume.

15. The process according to claim 14, wherein the ratio of the plurality of fibers to the resin matrix is in the range of about 30% to about 50% by volume.

16. The process according to claim 15, wherein the ratio of the plurality of fibers to the resin matrix is in the range of about 40% to about 50% by volume.

17. The process according to claim 1, wherein said composite reinforcement comprises an overall thickness less than about 0.060 inches.

18. The process according to claim 17, wherein said composite reinforcement comprises an overall thickness less than about 0.040 inches.

19. The process according to claim 18, wherein said composite reinforcement comprises an overall thickness less than about 0.030 inches.

20. The process according to claim 1, wherein said resin is selected from the group consisting of polyesters, vinyl esters, epoxy, phenolic, mixtures of polyesters, vinyl esters, epoxy and phenolic, and polyurethane.

21. The process according to claim 20, wherein said resin is at least one selected from the group consisting of thermoset polyurethane resin, thermoset phenolic resin, thermoset polyester resin, thermoset epoxy resin, thermoset melamine resin, and thermoset acrylic resin.

22. The process according to claim 1, wherein said flexible top die comprises a flexible steel sheet having a thickness in the range of 0.010" to 0.030".

23. A process for manufacturing a continuous fiber reinforced thermoset plastic material comprising the steps of:
tensioning a plurality of fibers by a tensioning device;
optionally guiding the plurality of fibers through a pre-treating station;
saturating the plurality of fibers with a resin in an impregnator;
positioning the plurality of impregnated fibers onto a first receiving member and initiating cure of the plurality of impregnated fibers on said first receiving member at an initial curing station, said initial curing station comprising a heated flexible top die;
applying a surface embossing and receiving a surface coating to said plurality of impregnated fibers to form a composite;

adding a second receiving member onto said composite to form a sandwich configuration;

applying pressure to said sandwich configuration, wherein said second receiving member is positioned to form said sandwich configuration with the plurality of fibers being in a center position and a receiving member on either side, wherein opposing pressure is applied on the receiving members so that the plurality of fibers is compressed between the receiving members; and guiding said sandwich configuration through a post-cure station for post-curing.

24. The process according to claim 23, further comprising the step of pulling said sandwich configuration through a pulling mechanism for accumulation and storage for future use.

25. The process according to claim 23, wherein the strength member comprises a fiber-reinforced composite material comprising a plurality of fibers impregnated with a polymeric matrix, the plurality of fibers are predominantly unidirectional reinforcing fibers, and the plurality of fibers that are impregnated with a polymeric matrix are predominately aligned along the longitudinal dimension of the strength.

26. The process according to claim 23, wherein said pretreating station is selected from the group consisting of an oven, infrared heater, and an electrostatic plasma device.

27. The process according to claim 23, wherein said step of saturating said fibers comprises saturating said fibers in said impregnator, wherein said impregnator comprises:

an entrance plate having a plurality of entry holes for facilitating the passing of the fibers into said impregnator, said entry holes having a length and cross-sectional area to limit the leakage of resin from inside the impregnator, and wherein said impregnator comprises said entrance plate having a plurality of holes for accommodating the fibers, said holes for positioning said fibers inside said impregnator for sufficient coating and alignment inside the impregnator;

a flooding chamber for facilitating the flow of the resin that is fed into the impregnator around the fibers and to facilitate contact with the fibers;

a compaction chamber for moving the fibers closer together and for initiating resin wet-out of the fibers, wherein said compaction chamber comprises an exit cross-sectional area that is reduced to about 15% to 25% of the entrance cross-sectional area and comprises a length that is about 1.5 times the entrance height;

a pressure chamber for completing the resin saturation and fiber alignment; and an exit mouth for maintaining fiber placement and for reducing the amount of excess resin which exits the impregnator, wherein said exit mouth comprises sides that are substantially parallel and has a length of about 1" to 2".

28. The process according to claim 23, wherein said first receiving member and said second receiving member are selected from the group consisting of aluminum, steel, metal alloys, thermoplastic, thermoset plastic, wood and wood products, and combinations of man made and/or natural materials, and wherein said first receiving member and said second receiving member comprise the same material or comprise different materials.

29. The process according to claim 23, wherein said curing step comprises at least one method selected from the group consisting of thermal contact curing, thermal convection curing, infrared curing, ultraviolet curing, electron beam curing and radio frequency curing, wherein the polymeric matrix is at least partially cured.

30. The process according to claim 23, further comprising a post-curing step comprising directing said sandwich configuration into a post cure chamber, wherein said post-curing step is selected from the group consisting of thermal contact curing, thermal convection curing, infrared curing, ultraviolet curing, electron beam curing, and radio frequency curing, and wherein the polymeric matrix is at least partially cured to the degree that final cure either has occurred or may occur at a future state of use.

31. The process according to claim 23, wherein said resin is selected from the group consisting of polyesters, vinyl esters, epoxy, phenolic, mixtures of polyesters, vinyl esters, epoxy and phenolic, and polyurethane.

32. The process according to claim 31, wherein said resin is at least one selected from the group consisting of thermoset polyurethane resin, thermoset phenolic resin, thermoset polyester resin, thermoset epoxy resin, thermoset melamine resin, and thermoset acrylic resin.

* * * * *